United States Patent
Yuri

(10) Patent No.: US 8,354,755 B2
(45) Date of Patent: Jan. 15, 2013

(54) COGENERATION SYSTEM

(75) Inventor: Nobuyuki Yuri, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 457 days.

(21) Appl. No.: 12/454,604

(22) Filed: May 20, 2009

(65) Prior Publication Data

US 2009/0295157 A1 Dec. 3, 2009

(30) Foreign Application Priority Data

Jun. 3, 2008 (JP) .................................. 2008-146200

(51) Int. Cl.
*F02D 29/06* (2006.01)
(52) U.S. Cl. ............ 290/2; 290/40 R; 290/40 C; 60/297
(58) Field of Classification Search .............. 290/2, 4 R, 290/40 R, 40 C; 123/2, 3; 60/618, 597, 616
See application file for complete search history.

(56) References Cited

U.S. PATENT DOCUMENTS

2008/0036211 A1* 2/2008 Lee et al. .......................... 290/2

FOREIGN PATENT DOCUMENTS

| JP | 2005-278231 A | 10/2005 |
| JP | 2005278231 A * | 10/2005 |

OTHER PUBLICATIONS

Machine translation of JP 2005278231 A.*

* cited by examiner

*Primary Examiner* — Quyen Leung
*Assistant Examiner* — Leda Pham
(74) *Attorney, Agent, or Firm* — Carrier Blackman & Associates, P.C.; Joseph P. Carrier; William D. Blackman

(57) ABSTRACT

In a cogeneration system having three generation units each equipped with a generator and an internal combustion engine, a single hot water tank is prepared for the three generation units to contain hot water heated by exhaust heat of the engine. The temperature of the hot water contained in the tank and a power demand of an electrical load are detected. Then, the number of the generation unit or units to be operated is determined based on the detected power demand when the detected hot water temperature is equal to or less than a first predetermined value, and operation of the generation unit or units determined to be operated is controlled, thereby reducing a space for the installment of the tank and heat loss from the tank.

10 Claims, 3 Drawing Sheets

COGENERATION SYSTEM

BACKGROUND OF THE INVENTION

1. Field of the Invention

This invention relates to a cogeneration system, and particularly to a cogeneration system having a plurality of power generation units each equipped with a generator and an internal combustion engine that drives the generator.

2. Description of the Related Art

In recent years, cogeneration systems have been developed that are equipped with an internal combustion engine-driven generator and are installed in an AC power supply line between a commercial power network and an electrical load for supplying or outputting power to the load in interconnection with the power network and also for supplying hot water or the like heated by the exhaust heat from the engine to a thermal load, i.e., a hot water tank that contains hot water.

When such a cogeneration system is installed in a facility, such as an apartment or condominium, that has a relatively large power demand and thermal demand, generally a plurality of generation units and hot water tanks are provided, as taught, for example, in Japanese Laid-Open Patent Application No. 2005-278231 (paragraphs 0012, 0015, FIG. 1, etc.). Specifically, each generation unit is coupled with one hot water tank and hence, the number of the units with tanks is increased.

However, if the multiple hot water tanks are installed as in the prior art, it causes increase in a space for the installation and also increase in thermal radiation (heat loss) from the tanks.

SUMMARY OF THE INVENTION

An object of this invention is therefore to overcome the foregoing problem by providing a cogeneration system having a plurality of generation units each equipped with a generator and a hot water tank, thereby reducing a space for the installment of the tank and heat loss from the tank.

In order to achieve the object, this invention provides, in its first aspect, a cogeneration system having a plurality of generation units each equipped with a generator adapted to be connectable to an AC power feed line between a commercial power network and an electrical load, and an internal combustion engine for driving the generator, comprising: a hot water tank connected to the generation units to contain hot water heated by exhaust heat of the engine; a temperature detector that detects temperature of the hot water contained in the tank; a power demand detector that detects a power demand of the electrical load; a generation unit number determiner that determines number of the generation unit or units to be operated based on the detected power demand when the detected hot water temperature is equal to or less than a first predetermined value; and a generation unit controller that controls operation of the generation unit or units determined to be operated.

In order to achieve the object, this invention provides, in its second aspect, a method of controlling a cogeneration system having a plurality of generation units each equipped with a generator adapted to be connectable to an AC power feed line between a commercial power network and an electrical load, and an internal combustion engine for driving the generator, and a hot water tank connected to the generation units to contain hot water heated by exhaust heat of the engine, comprising the steps of: detecting temperature of the hot water contained in the tank; detecting a power demand of the electrical load; determining number of the generation unit or units to be operated based on the detected power demand when the detected hot water temperature is equal to or less than a first predetermined value; and controlling operation of the generation unit or units determined to be operated.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A cogeneration system according to an embodiment of the invention will now be explained with reference to the attached drawings.

Figure 1:
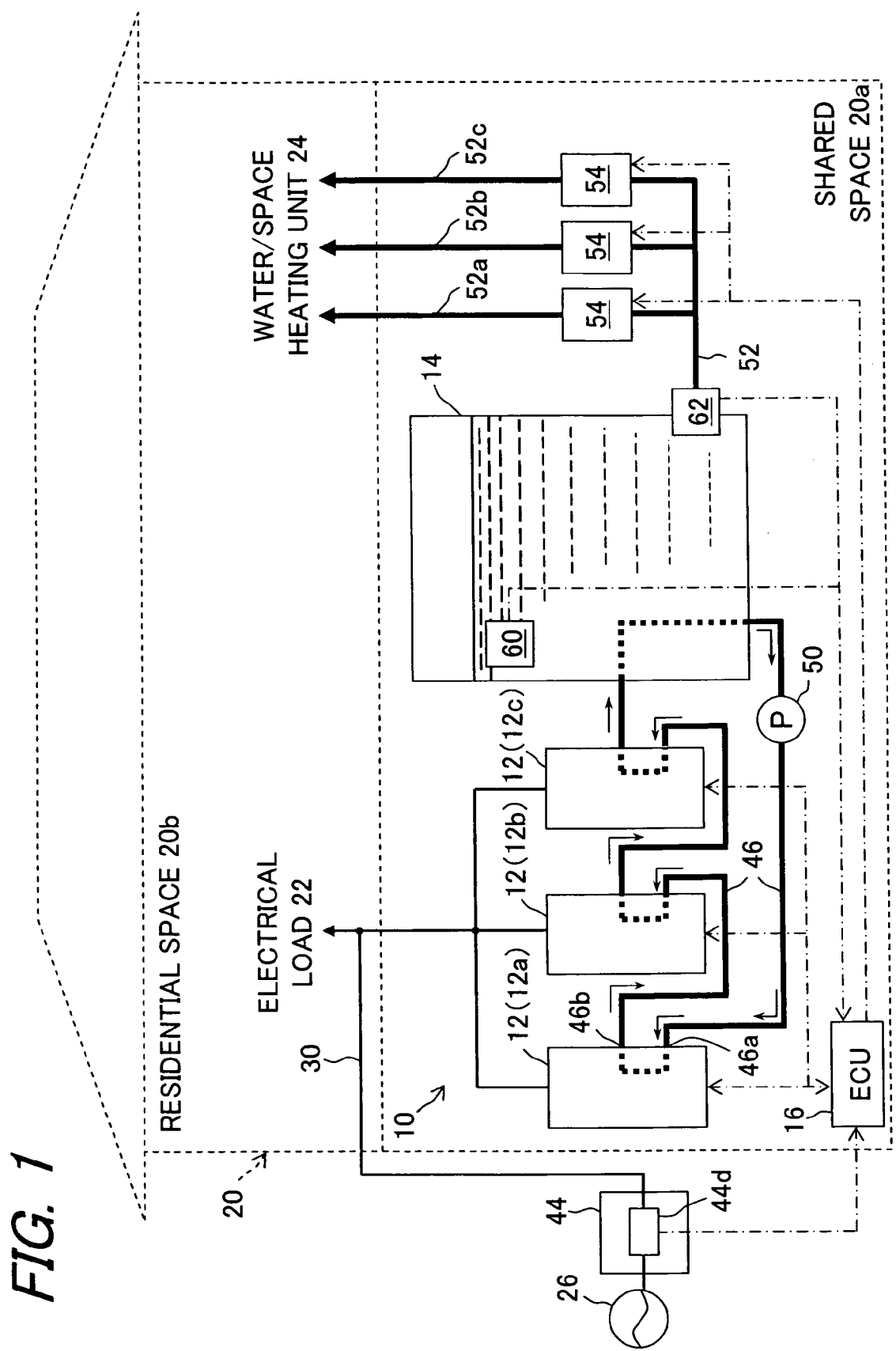
FIG. 1 is a block diagram giving an overall view of a cogeneration system according to an embodiment of this invention.

FIG. 1 is a block diagram giving an overall view of a cogeneration system according to an embodiment of this invention.

In FIG. 1, reference numeral 10 designates the cogeneration system. The cogeneration system 10 is equipped with a plurality of, i.e., three power generation units 12 each having a generator, an internal combustion engine (hereinafter called "engine") (explained later) and the like, with a single hot water tank (thermal load) 14 that is connected to the generation units 12 and contains hot water generated by exhaust heat of the engine, and with an electronic control unit (ECU) 16 that comprises a microcomputer having a CPU, ROM, RAM and counter. In the figure, the three generation units 12 are indicated by reference numerals 12a, 12b, 12c.

The cogeneration system 10 is installed in a facility (i.e., an apartment or condominium) 20 that has a relatively large power demand and thermal demand. As shown in FIG. 1, the facility 20 is divided into a shared space 20a installed with the cogeneration system 10 and the like, and a residential space 20b provided with a domestic electrical load (i.e., a lighting fixture, etc.) 22, water/space heating equipment (i.e., a water heater of a kitchen, bathroom, etc., or a water/space heating unit using exhaust heat) 24 and the like.

Figure 2:
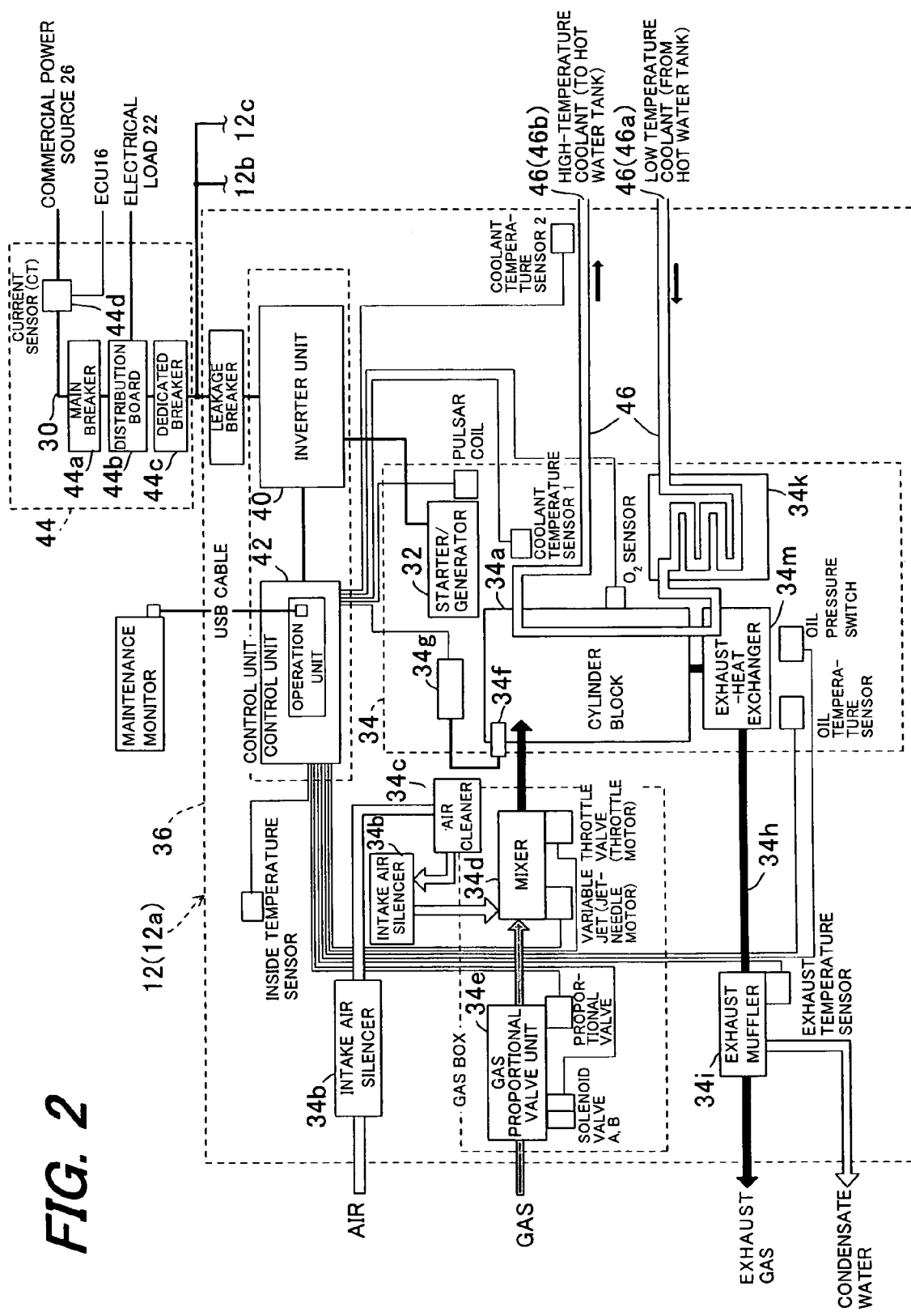
FIG. 2 is a block diagram showing one generation unit among three generation units shown in FIG. 1.

FIG. 2 is a block diagram showing the details of the generation unit 12, specifically the generation unit 12a among the three generation units 12a, 12b, 12c shown in FIG. 1. Although the generation unit 12 is explained in detail taking the unit 12a as an example, since the other units 12b, 12c also have the substantially same configuration, the following explanation can be applied.

The generation unit 12 includes the generator (starter/generator; now assigned by reference numeral 32) connectable to an AC power feed line 30 between a commercial power source (commercial power network) 26 and the electrical load 22, and the engine (now assigned by reference numeral 34) for driving the generator 32. The power source 26 outputs single-phase, three-wire, 100/200 V, 50 Hz (or 60 Hz) AC power. The generation unit 12 is made integral and housed in a generation unit case 36.

The engine 34 is a single-cylinder, four-cycle, water-cooled, spark-ignition, OHV engine that runs on the city gas or LP (liquefied petroleum) gas (hereinafter simply called "gas") and has a displacement of, for example, 163 cc.

Although not illustrated, the cylinder head and cylinder block 34a of the engine 34 are laid in the horizontal (lateral) direction in the generation unit case 36, and a piston is accommodated in the cylinder to reciprocate. The piston is connected to the crankshaft (not shown) laid in the vertical (longitudinal) direction.

The generator 32 constituted of multi-polar coils is fixed on a crank case at a location within a flywheel (not shown). The flywheel is attached to the upper end of the crankshaft and has magnet pieces on the inside surface that are arranged to face the coils. The generator 32 produces alternating current when the coils cross the flux emitted from the magnet pieces in response to the rotation of the flywheel. The generator 32 functions also as a starter motor for cranking the engine 34 when supplied with power from the power source 26 (or a battery which is not shown).

In the engine 34, air (intake air) flows into a mixer 34d through an intake air silencer 34b and air cleaner 34c. The mixer 34d is supplied with gas from a fuel supply source (not shown) through a gas proportional valve unit 34e to mix with air. The mixer 34d and gas proportional valve unit 34e constitute a gas box. The mixer 34d is equipped with a throttle valve driven by an electric motor and with a variable jet (jet-needle motor).

The air-fuel mixture produced in the mixer 34d flows into a combustion chamber (not shown). An ignition plug 34f installed near the combustion chamber generates spark discharge between electrodes which face the combustion chamber to ignite and burn the air-fuel mixture when being supplied with an output of a battery (not shown) through an ignition device 34g having a power transistor, ignition coil and the like. The exhaust gas thus generated is discharged to the exterior of the generation unit case 36 through an exhaust pipe 34h and exhaust muffler 34i.

An oil tank or oil pan 34k is formed below the cylinder block 34a of the engine 34 (the crank case is not illustrated) for containing lubricant oil of the engine 34. The lubricant oil is pumped up by a gear pump (not shown) to lubricate a sliding portion of the piston or the like, and comes down along a connecting rod (not shown) or wall surface of the cylinder to be contained in the oil tank 34k.

The output of the generator 32 is sent to an inverter unit 40 where it is inverted to 100/200 V AC power (single phase) through a DC-DC converter and the like. The inverter unit 40 is connected to a control unit 42 that controls the operation of the generation unit 12 (12a) and switches the function of the generator 32 between the starter and the generator upon receipt of a command from the control unit 42.

As shown in FIG. 2, the output of the inverter unit 40 of the generation unit 12 (precisely, generation unit 12a) is combined with the outputs of inverter units (not shown) of the other two generation units 12b, 12c and sent to an indoor switchboard 44. The switchboard 44 includes a main breaker 44a that prevents over-current and the like, a distribution board 44b that adds power from the power source 26 to the combined output of the inverter units and supplies it to the electrical load 22, a dedicated breaker 44c applied for the generation units 12a, 12b, 12c, a current sensor (power demand detector) 44d that is installed in the power feed line 30 between the power source 26 and the main breaker 44a to produce an output or signal indicative of AC power current flowing therethrough, and other elements. The output of the current sensor 44d is sent to the ECU 16.

Thus, the output of the inverter unit 40 is adapted to connectable to the power feed line 30 between the power source 26 and the electrical load 22 in the switchboard 44. The power output (rated output) of each generation unit 12 is 1.0 kW or thereabout.

Reference numeral 46 designates a passage of coolant (antifreeze liquid) for cooling the engine 34. The passage 46 passes through the cylinder block 34a and oil tank 34k of the engine 34 and then is connected to the hot water tank 14 located in the outside of the generation unit 12.

Specifically, as shown in FIGS. 1 and 2, the coolant at low temperature is pumped by a circulation pump 50 from the tank 14 to be lead to the inlet side 46a of the passage 46, flows through a tank passage formed in the oil tank 34k to heat-exchange with the lubricant oil to cool down the oil and then is warmed up by heat exchange with the exhaust gas in an exhaust-heat exchanger 34m installed at the exhaust pipe 34h. The exhaust-heat exchanger 34m has a structure of covering the exhaust pipe 34h with its shape of, for example, deformation of the passage 46.

After passing the exhaust-heat exchanger 34m, the coolant passes through a cylinder passage formed in the cylinder block (and the cylinder head) 34a to heat-exchange with the engine 34 for cooling the engine 34. The coolant at high temperature which became hot by being warmed up by the heat exchange with the exhaust gas and engine 34 returns through the outlet side 46b to the tank 14 where it warms up contained water to make hot water. Thus the hot water generated using exhaust heat of the engine 34 is contained in the hot water tank 34.

As shown in FIG. 2, the generation unit 12 is equipped with many sensors and based on the outputs thereof, the control unit 42 controls the operation of the engine 34 and the like. Since, however, this control is not directly related to the gist of this invention and will not be explained.

Returning to the explanation of FIG. 1, the tank 14 is provided with an outflow channel 52 through which the contained water outflows. As illustrated, the outflow channel 52 is divided into a plurality of, i.e., three outflow branches 52a, 52b, 52c at the downstream that are connected to the water/space heating equipment 24 in the associated residential space 20b.

The outflow branches 52a, 52b, 52c branching from the outflow channel 52 are each connected with an auxiliary boiler (heater) 54. The boiler 54 is connected to the above-mentioned fuel supply source so as to burn gas supplied therefrom when a drive signal is outputted from the ECU 16, for heating hot water flowing through the outflow branches 52a, 52b, 52c.

A first temperature sensor (detector) 60 is installed at the tank 14, precisely at the upper portion thereof in the vertical direction, and produces an output or signal indicative of temperature T1 of hot water (precisely the temperature of hot water at the upper portion) contained in the tank 14. A second temperature sensor (detector) 62 is installed near the outlet of the tank 14, precisely at a connecting point between the tank 14 and the outflow channel 52, and produces an output or signal indicative of temperature T2 of hot water which outflows from the tank 14 (i.e., the temperature of hot water at the lower portion in the tank 14). The outputs of the sensors 60, 62 are sent to the ECU 16.

The ECU 16 is connected to the control unit 42 of the generation unit 12 (shown in FIG. 2) to be able to communicate and, based on the outputs of the temperature sensors 60, 62, current sensor 44d and the like, controls the operation of the generation unit 12 and boiler 54.

Figure 3:
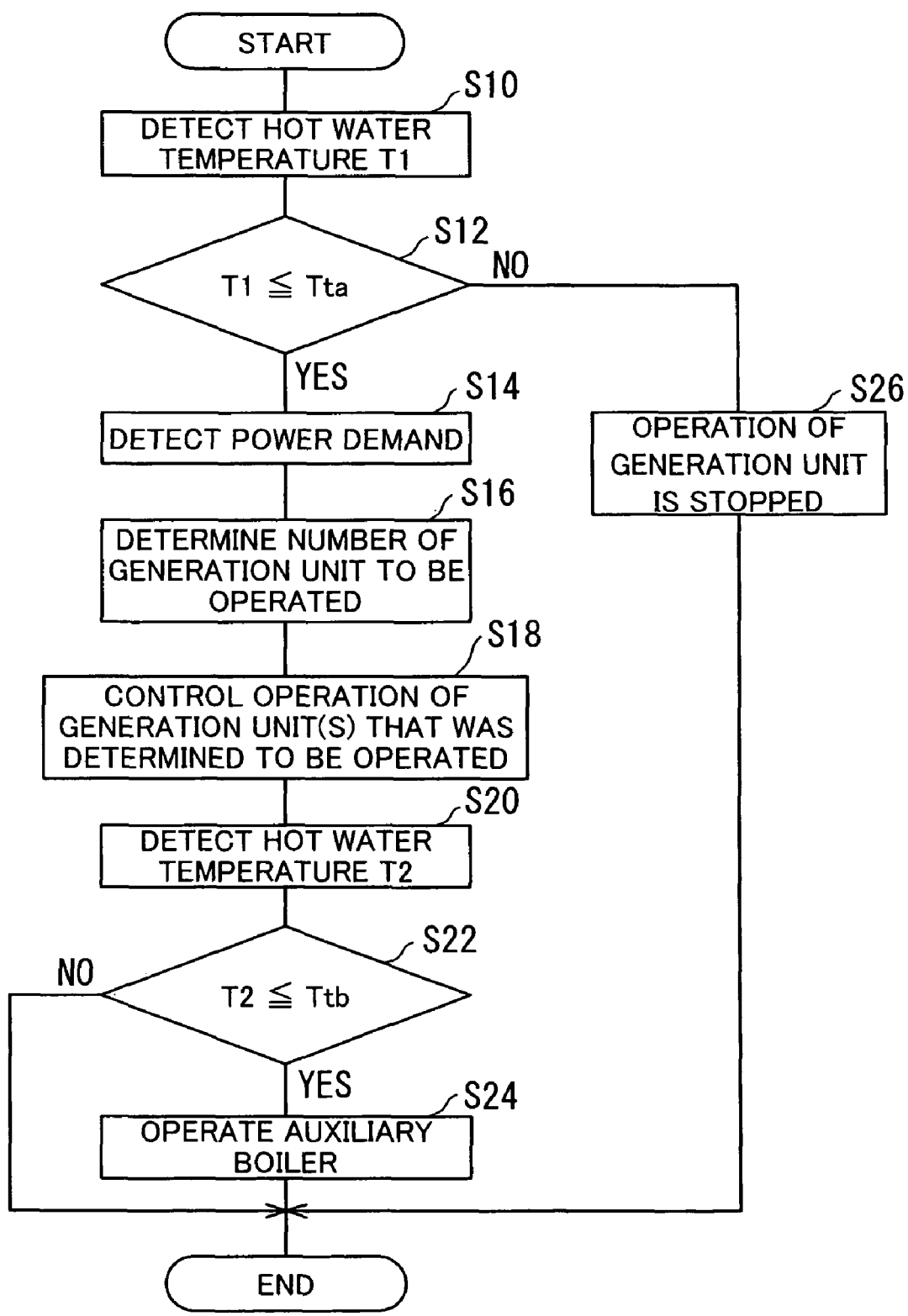
FIG. 3 is a flowchart showing the operation of an ECU shown in FIG. 1.

FIG. 3 is a flowchart showing the operation of the ECU 16, i.e., the operation of the cogeneration system 10 according to this embodiment. The illustrated program is executed at a predetermined interval, i.e., 10 milliseconds.

The program begins in S10, in which the temperature T1 of hot water in the tank 14, i.e., hot water in the upper portion of the tank 14 is detected or calculated based on the output of the first temperature sensor 60.

The program proceeds to S12, in which it is determined whether the detected temperature T1 is equal to or less than a first predetermined value Tta. The first predetermined value Tta is set to a value indicative of a thermal demand of hot water in the tank 14, specifically 65° C.

When the result in S12 is Yes, i.e., it is determined that there is a thermal demand, the program proceeds to S14, in which a power demand (amount of power use) in the electrical load 22 is detected or calculated based on the output of the current sensor 44d, and to S16, in which the number of generation units 12 to be operated is determined based on the detected power demand.

Specifically, since the rated power of one generation unit 12 is 1.0 kW, when the power demand is equal to or slightly greater than 1.0 kW, it is determined that one generation unit 12 should be operated. When the power demand is equal to or slightly greater than 2.0 kW, two of them are operated and when it is greater than 3.0 kW, all of the three generation units 12 are driven.

Thus, in the embodiment, the number of the generation units to be operated is increased with increasing power demand, but the generated power is all outputted to the electrical load 22, thereby preventing efficiency loss of the cogeneration system 10.

Next, the program proceeds to S18, in which the operation of the generation unit(s) 12 determined to be operated in S16 is controlled, i.e., the generation unit(s) 12 of the determined number is operated.

With this, power from the operated generation unit(s) 12 is supplied to the electrical load 22 and exhaust heat of the engine 34 generated due to the operation of the generation unit(s) 12 is supplied to the tank 14 to further raise the temperature of hot water in the tank 14. If the power demand exceeds the output power of the generation units 12 and electric power lacks, this electricity shortfall is covered by supplying power from the power source 26 to the electrical load 22.

The program then proceeds to S20, in which the temperature T2 of hot water contained around the outlet of the tank 14, i.e., hot water to be supplied from the tank 14 to the water/space heating equipment 24, is detected or calculated based on the output of the second temperature sensor 62.

The program then proceeds to S22, in which it is determined whether the detected temperature T2 is equal to or less than a second predetermined value Ttb. The second predetermined value Ttb is set to a value required by the equipment 24 which is a destination of the hot water, specifically 60° C.

When the result in S22 is No, since it means that hot water of appropriate temperature has been sufficiently supplied to the equipment 24, the remaining steps are skipped and the program is terminated.

On the other hand, when the result is Yes, the program proceeds to S24, in which a drive signal is sent to the boiler 54 to operate it for further heating hot water flowing through the outflow channel 52, precisely its outflow branches 52a, 52b, 52c. As a result, the equipment 24 can be supplied with hot water warmed up to the required temperature.

When the result in S12 is No, the program proceeds to S26, in which the operation of the generation unit(s) 12 is stopped. Specifically, when it is determined that there is no thermal demand of hot water in the tank 14, the operation of all the generation units 12 is stopped. Therefore, since exhaust heat of the engine 34 of the generation unit 12 is not supplied to the tank 14, it becomes possible to prevent extra heat from being generated.

As stated above, the embodiment is configured to have a cogeneration system (or a method thereof) 10 having a plurality of generation units (12, 12a, 12b, 12c) each equipped with a generator (32) adapted to be connectable to an AC power feed line (30) between a commercial power network (26) and an electrical load (22), and an internal combustion engine (34) for driving the generator, comprising: a hot water tank (14) connected to the generation units to contain hot water heated by exhaust heat of the engine; a temperature detector (first and second temperature sensor 60, 62, ECU 16, S10) that detects temperature of the hot water contained in the tank; a power demand detector (current sensor 44d, ECU 16, S14) that detects a power demand of the electrical load; a generation unit number determiner (ECU 16, S16) that determines number of the generation unit or units to be operated based on the detected power demand when the detected hot water temperature is equal to or less than a first predetermined value Tta; and a generation unit controller (ECU 16, S18) that controls operation of the generation unit or units determined to be operated.

Since it is thus configured to have the single hot water tank 14 installed for a plurality of the generation units 12, it becomes possible to reduce a space for the installation of the tank 14, compared to the case where the hot water tank is provided for each generation unit, reduce heat loss from the tank 14, and also reduce cost.

In the system, number of the generation unit or units to be operated is determined based on the detected power demand when the detected hot water temperature is equal to or less than a first predetermined value Tta, in other words when there is a thermal demand of the hot water in the tank and operation of the generation unit or units determined to be operated is controlled. With this, it becomes possible to supply or output heat and electric power to satisfy the thermal demand and power demand, thereby improving flexibility for change in those demands.

The system further includes: a generation unit stopper (ECU 16, S12, S16) that stops the operation of the generation unit when the detected hot water temperature exceeds the first predetermined value Tta. Since it is configured to stop the generation unit 12 when there is no thermal demand in the tank 14, it becomes possible to prevent extra heat from being generated, thereby improving efficiency of the whole cogeneration system 10.

The system further includes: a heater (auxiliary boiler 54) that is connected to the tank and heats the hot water when the detected hot water temperature is equal to or less than a second predetermined value Ttb. With this, when the temperature of hot water in the tank 14 is relatively low due to insufficient engine exhaust heat, the hot water can be heated by the heater (auxiliary boiler 54), thereby increasing the hot water temperature to a desired value.

In the system, the first predetermined value Tta is set to a value indicative of a thermal demand of the hot water in the tank 14 and the second predetermined value Ttb is set to a value required by the equipment which is a destination of the hot water.

It should be noted that, although in the foregoing the number of the generation units 12 installed is three, it can instead be two or four, or more. It suffices if the single hot water tank 14 is prepared for a plurality of the generation units 12.

It should also be noted that, although a gas engine using gas fuel such as the city gas or LP gas is taken as an example of the power source of the generator 32, the engine can be one utilizing gasoline fuel or the like instead. Also, the rated output of the generation unit 12, displacement of the engine 34 and the like are shown by specific values, but they are only examples and should not be limited thereto.

It should further be noted that, although the AC power outputted from the power source 26 is defined as 100/200 V in the foregoing embodiment, when the power source 26 outputs AC power exceeding 100/200 V, the generation unit 12 should naturally output voltage corresponding to that power.

Japanese Patent Application No. 2008-146200 filed on Jun. 3, 2008, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A cogeneration system having a plurality of generation units each equipped with a generator adapted to be connectable to an AC power feed line between a commercial power network and an electrical load, and an internal combustion engine for driving the generator, comprising:
 a hot water tank fluidly connected to the generation units to contain hot water heated by exhaust heat of the engine;
 a temperature detector that detects temperature of the hot water contained in the tank;
 a power demand detector comprising a current sensor that detects a power demand of the electrical load;
 a generation unit number determiner that determines number of the generation unit or units to be operated based on the detected power demand when the detected hot water temperature is equal to or less than a first predetermined value; and
 a generation unit controller that controls operation of the generation unit or units determined to be operated.

2. The system according to claim 1, further including:
 a generation unit stopper that stops the operation of the generation unit when the detected hot water temperature exceeds the first predetermined value.

3. The system according to claim 1, further including:
 a heater that is connected to the tank and heats the hot water when the detected hot water temperature is equal to or less than a second predetermined value.

4. The system according to claim 1, wherein the first predetermined value is set to a value indicative of a thermal demand of the hot water in the tank.

5. The system according to claim 3, wherein the second predetermined value is set to a value required by equipment which is a destination of the hot water.

6. A method of controlling a cogeneration system having a plurality of generation units each equipped with a generator adapted to be connectable to an AC power feed line between a commercial power network and an electrical load, and an internal combustion engine for driving the generator, and a hot water tank fluidly connected to the generation units to contain hot water heated by exhaust heat of the engine, comprising the steps of:
 detecting temperature of the hot water contained in the tank;
 detecting by a current sensor a power demand of the electrical load;
 determining number of the generation unit or units to be operated based on the detected power demand when the detected hot water temperature is equal to or less than a first predetermined value; and
 controlling operation of the generation unit or units determined to be operated.

7. The method according to claim 6, further including the step of:
 stopping the operation of the generation unit when the detected hot water temperature exceeds the first predetermined value.

8. The method according to claim 6, further including the step of:
 heating the hot water when the detected hot water temperature is equal to or less than a second predetermined value.

9. The method according to claim 6, wherein the first predetermined value is set to a value indicative of a thermal demand of the hot water in the tank.

10. The method according to claim 8, wherein the second predetermined value is set to a value required by equipment which is a destination of the hot water.

* * * * *